(No Model.) 2 Sheets—Sheet 1.

W. A. DUGAN & C. H. BAILEY.
DAMPER.

No. 564,061. Patented July 14, 1896.

WITNESSES
William A. Luret
Charles D. Brintnall

INVENTORS
William A. Dugan
Charles H. Bailey
by W. E. Hagan
atty (No Model.) 2 Sheets—Sheet 2.

W. A. DUGAN & C. H. BAILEY.
DAMPER.

No. 564,061. Patented July 14, 1896.

WITNESSES
William A. Ivet
Charles S. Brindnall

INVENTORS
William A. Dugan
Charles H. Bailey
by W. E. Hagan atty

UNITED STATES PATENT OFFICE.

WILLIAM A. DUGAN, OF LANSINGBURG, AND CHARLES H. BAILEY, OF TROY, NEW YORK, ASSIGNORS TO THE FULLER & WARREN COMPANY, OF TROY, NEW YORK.

DAMPER.

SPECIFICATION forming part of Letters Patent No. 564,061, dated July 14, 1896.

Application filed March 15, 1895. Serial No. 541,869. (No model.)

*To all whom it may concern:*

Be it known that we, WILLIAM A. DUGAN, of the village of Lansingburg, and CHARLES H. BAILEY, of the city of Troy, in the county of Rensselaer, State of New York, have invented a new and useful Improvement in Dampers, of which the following is a specification.

Our invention relates to dampers such as are applied to the smoke or exit pipes of stoves or furnaces to regulate the draft, and especially to combinations of two dampers thus employed, the additional or supplementary damper being used to admit air to the exit-pipe back of the main damper when the latter is closed.

Our said invention consists in the construction and combination of parts, substantially as hereinafter set forth and claimed.

Figure 1:
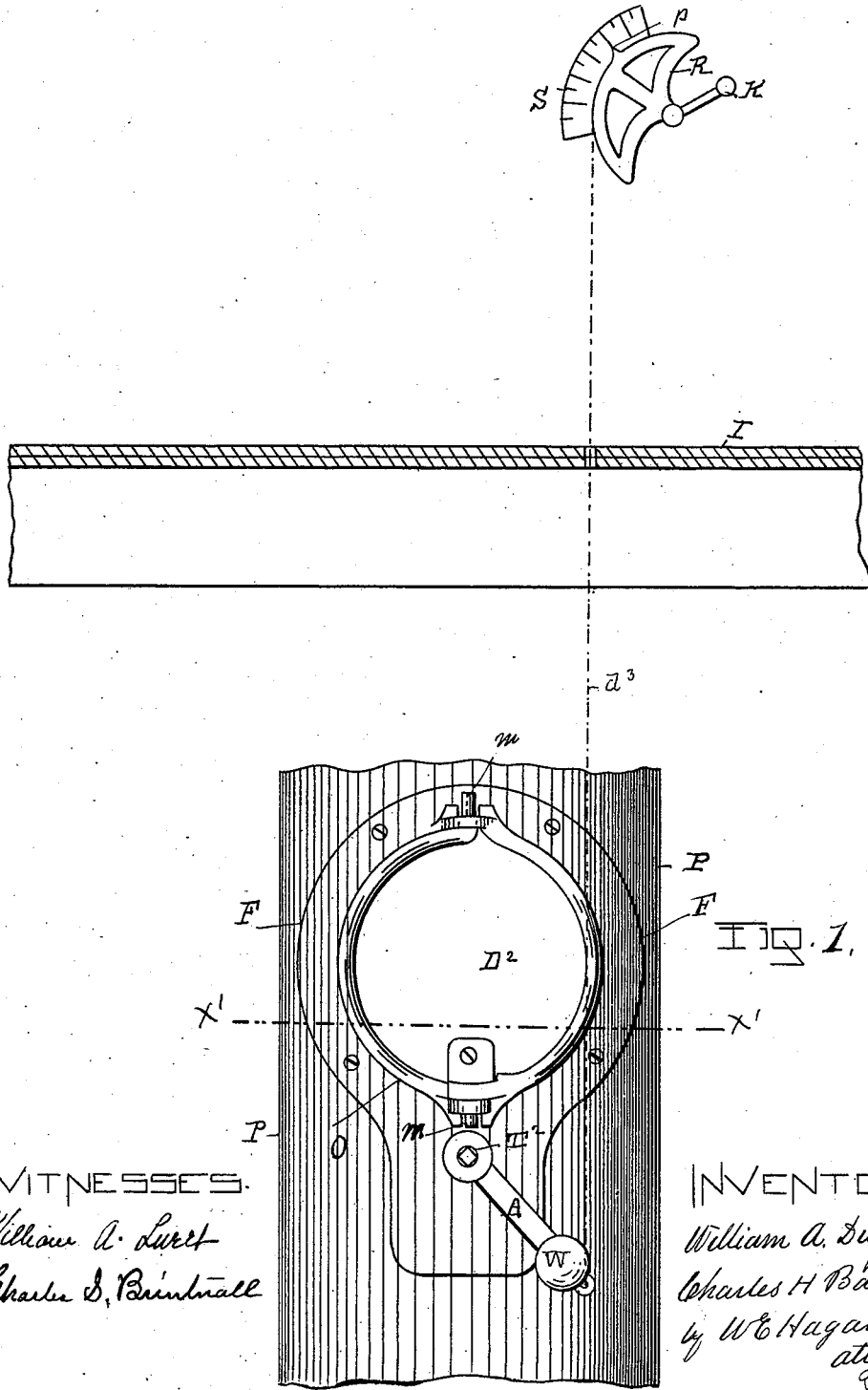
Figure 3:
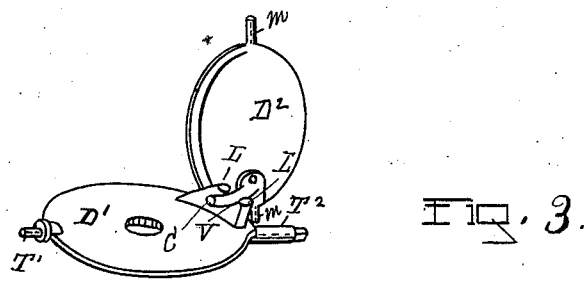
Figure 2:
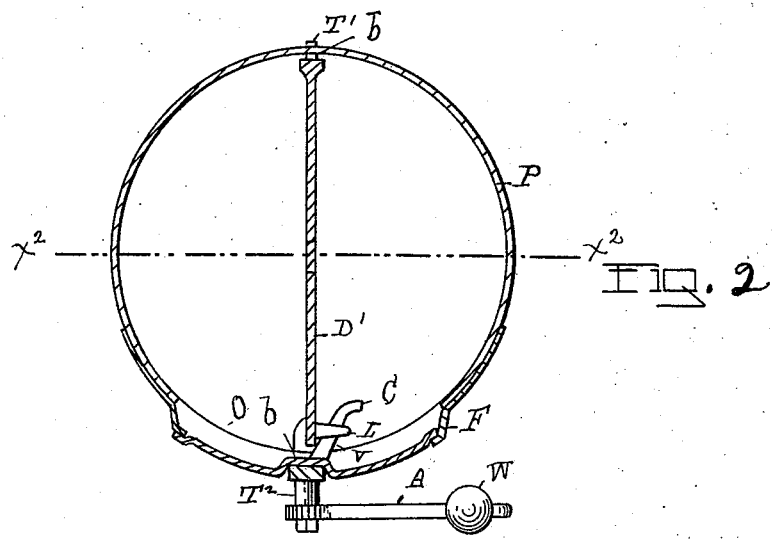
Figure 4:
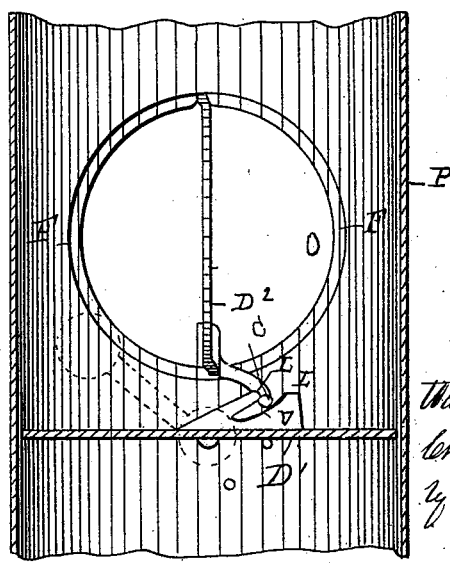

Figure 1 represents a front elevation of mechanism embodying my invention applied to a vertical exit flue-pipe and provided with means for operating it from an upper room. Figs. 2 and 3 represent sections, respectively, on lines $x'\ x'$ of Fig. 1 and $x^2\ x^2$ of Fig. 2; and Fig. 4 represents a detail perspective view of the dampers.

The several parts of the apparatus thus illustrated are designated by letter-reference, and the function of the parts is described as follows:

The letters D' designate the damper proper, which is arranged transversely within the exit-pipe P, said damper having trunnion-form journals T' and $T^2$, adapted to turn in bearings $b$, made in the sides of the pipe at diametrically opposite points, with the trunnion-form journal $T^2$ extending through and projecting from the pipe side thereat, provided with a weighted crank-arm A, which operates, by means of its weighted end, to open the damper proper and close the supplemental damper.

The letters L L designate two lugs that are projected from the damper proper upon the side facing the chimney, and these lugs are so formed and projected as to produce between them the V-form recess V.

The letter $D^2$ designates the supplemental damper, which is arranged within the frame F, placed upon and secured to one side of the pipe P where cut away to receive it at O, between the damper proper and the chimney. This supplemental damper has journals $m$ $m$, arranged in the frame F. When the damper proper is closed and the supplemental damper open, the chimney-draft draws from the room mainly and checks the measure of draft force exerted upon the stove or furnace.

The letter C designates a curved pin that is projected from the inner face of the supplemental damper $D^2$, and this pin, when the damper proper is closed, rests within the recess V, but when the trunnion-journal $T^2$ is operated by the weighted crank-arm A to close the damper proper the pin C is caused to make a cam engagement with the sides of the recess V, which causes the supplemental damper to open and remain open while the weighted arm A is raised at its outer end and to descend when the pull upon this arm is released. This trunnion-journal $T^2$ is made square in section where extending beyond the frame F, and the crank-arm A is made with a square socket for the reception of the trunnion, so that by shifting the position of the arm its weighted end W can be used to operate the damper as placed in a vertically or horizontally located exit-pipe.

The letters $d^3$ designate a line connected with the arm A, which line passes up through the floor I and there connects with a weighted turn-lever R, operated by a crank K, by which the distance at which the damper proper and supplemental damper are operated to open and close is regulated, and the letter $p$ designates a pointer arranged upon the turn-lever, and S a segmental-form plate laid off with a scale indicating, by the relative position of the pointer, the distance at which the dampers are opened or closed. By this means the heat emanating from the furnace may be regulated by a person in one of the rooms of the building other than that in which the furnace is placed, although our invention may be used without the line connection $d^3$ and the scale and turn-lever.

Having thus described our invention, what we claim, and desire to secure by Letters Patent, is—

The combination with a damper proper arranged transversely within a heater or furnace exit-pipe and having journals on which to turn, with one of the latter projected through the pipe side and thereat provided with a weighted crank-arm, and said damper proper having lugs projected from its outer face to form an intermediate recess; and a supplemental damper arranged in the side of the pipe and adapted to turn therein and provided with a pin on its inner face adapted to make a cam engagement with the recess on the damper proper, so that as the latter is operated to close, this engagement will open the supplemental damper, substantially in the manner as and for the purposes set forth.

Signed at Troy, New York, this 20th day of November, 1893, and in the presence of the two witnesses whose names are hereto written.

WM. A. DUGAN.
CHARLES H. BAILEY.

Witnesses:
W. E. HAGAN,
CHARLES S. BRINTNALL.